United States Patent [19]

Repplinger et al.

[11] Patent Number: 5,038,253

[45] Date of Patent: Aug. 6, 1991

[54] TRANSCEIVER MOUNTING ASSEMBLY HAVING INTEGRALLY FORMED LOCK

[75] Inventors: Daniel J. Repplinger, Lake Zurich; Brian D. Kay, Arlington Heights; Gary R. Weiss, Wheeling, all of Ill.

[73] Assignee: Motorola, Inc., Schaumburg, Ill.

[21] Appl. No.: 523,634

[22] Filed: May 14, 1990

[51] Int. Cl.$^5$ ............................................. H05K 7/14
[52] U.S. Cl. ..................................... 361/417; 361/427
[58] Field of Search ................ 455/90, 346, 347, 348; 248/222.1, 225.1; 361/417, 418, 419, 420, 427

[56] References Cited

U.S. PATENT DOCUMENTS

| | | | |
|---|---|---|---|
| 3,822,049 | 7/1974 | Saunders | 248/225.1 |
| 4,426,056 | 1/1984 | Gelardi et al. | 248/225.1 |
| 4,609,172 | 9/1986 | Dorner | 248/222.1 |
| 4,784,361 | 11/1988 | Kobayashi et al. | 248/222.1 X |
| 4,930,696 | 6/1990 | Van Acker | 248/225.1 X |

FOREIGN PATENT DOCUMENTS

| | | | |
|---|---|---|---|
| 0304598 | 3/1989 | European Pat. Off. | 455/346 |
| 0105126 | 5/1986 | Japan | 455/90 |

Primary Examiner—Leo P. Picard
Assistant Examiner—Michael W. Phillips
Attorney, Agent, or Firm—Robert H. Kelly

[57] ABSTRACT

A mounting assembly for mounting a transceiver thereupon. The mounting assembly is integrally formed of a flexible material, and permits affixation of the transceiver thereto when the transceiver is positioned in a confronting relation upon the assembly, and then translated into a locking position thereupon. A lock formed integral with the mounting assembly locks the transceiver in the locking position. Application of an actuation force upon the lock unlocks the transceiver to permit translation of the transceiver out of the locking position to permit the transceiver to be lifted thereaway.

13 Claims, 4 Drawing Sheets

TRANSCEIVER MOUNTING ASSEMBLY HAVING INTEGRALLY FORMED LOCK

BACKGROUND OF THE INVENTION

The present invention relates generally to mounting apparatus, and, more particularly, to a mounting assembly for mounting a portable transceiver thereupon.

Cellular communication systems permit a user to communicate telephonically at virtually any location. As continual improvements in the field of cellular communications have permitted ever greater numbers of users to utilize the cellular communication systems to communicate therethrough, the sale and use of cellular phones has increased dramatically in recent years.

A cellular communication system is created by positioning receiving stations at spaced-apart locations throughout a geographical area. Each receiving station receives radio frequency signals generated by a cellular phone when the phone is located in the vicinity of the receiving station, and the receiving stations are positioned throughout the geographical area such that the cellular phone positioned at any location in the geographical area is within the reception range of at least one of the receiving stations. The geographical area is divided into portions, and the number of portions into which the geographical area is divided is determined by the number of receiving stations positioned throughout the geographical area such that one receiving station is positioned in each portion of the geographical area. Each portion is defined to be a cell, and the signal transmitted by a cellular phone when positioned in a particular one of the cells is received by the receiving station which defines the cell.

A user operating a cellular phone when positioned in a particular cell communicates telephonically by transmitting a radio frequency signal to the receiving station. The receiving station is connected to a conventional telephone system to permit signals transmitted to the receiving station to be transmitted therealong. Numerous users of numerous cellular phones may simultaneously transmit signals to the same receiving station by transmitting signals at various different frequencies, or through the implementation of digital multiplexing techniques.

While a user may communicate telephonically through a cellular communication system when situated at any fixed location in the geographical area encompassed by the cellular communication system, cellular communication systems are perhaps most frequently utilized by operators traveling in an automobile or other vehicle. When carried in a vehicle, a cellular phone is referred to as a mobile phone, and the phone must be constructed to permit usage thereof as the vehicle is travelling towards or away from a receiving station. As the vehicle in which the mobile phone is positioned travels through successive cells, the signals transmitted by the mobile phone are received by successive receiving stations to permit continuity of telephonic communication.

Earlier designs of mobile phones were of significant dimensions and weights. The weights and dimensions of the phone were great enough to limit significantly the portability of the phone. In fact, in many instances, the phones were of such dimensions that substantial portions of the phones (e.g., transmit/receive circuitry and amplification circuitry) were placed in a trunk, or other storage area, of the vehicle, and, once installed thereat, were only removed with great infrequency, and with significant difficulty.

Increased miniaturization of the various components of the mobile phone permit the phone to be housed in ever-smaller packages. As a result, in many instances, the aforementioned phone component portions previously installed and affixed in a trunk, or other storage area, of a vehicle, may be conveniently carried in the passenger compartment of the vehicle. For instance, many mobile phone designs permit transmit/receive and amplification circuitry to be housed within a compact housing which is of dimensions to permit positioning thereof directly beneath a seat in the passenger compartment, or in a glove box compartment. When positioned thereat, the transceiver housing is readily accessible by a user, thereby greatly increasing the portability of the phone. In fact, several cellular phone designs, referred to as transportable phones, may alternately be carried within an automobile to function as a mobile phone, or directly by the user to function as a portable phone.

Mounting apparatus is available to affix component portions of the mobile phone (to be referred to hereinafter generically as a transceiver) at a mounting location of the vehicle, or at any other mounting location. The mounting apparatus affixes the transceiver in position to support the housing thereby. Additionally, several existing mounting apparatus further provide means to absorb vibrational forces generated during operation of the automobile. Such forces, if transmitted to the various circuitry of the transceiver, can cause damage thereto.

However, existing mounting apparatus was developed for use in conjunction with transceivers of the aforementioned greater dimensions and weights. Such existing mounting apparatus was not designed to support transceivers of dimensions suitable for placement in small areas, such as, for example, upon a floorboard beneath a seat in the passenger compartment of an automobile. Additionally, such existing mounting apparatus, designed to support the transceivers of the greater dimensions and weights, were not developed with the intent to permit quick or simple removal of the transceiver from the mounting apparatus.

In short, existing mounting apparatus does not advantageously facilitate or enhance the portability of the transceiver which is otherwise increasingly permitted due to the ever-decreasing dimensional requirements of the transceiver.

Increasingly, many users of cellular phones own or make use of more than one vehicle, and desire to carry a single mobile phone in the vehicle which the user wishes to operate. The transceiver should, therefore, be of a design to permit convenient positioning thereof in any one of the vehicles. To facilitate such interchangeability, the mounting apparatus to which the transceiver is mounted must permit the transceiver to be quickly and easily dismounted therefrom, and, thereafter, to be mounted quickly and easily to subsequent mounting apparatus.

What is needed, therefore, is mounting apparatus which permits quick mounting and/or dismounting of a transceiver therefrom to increase the portability of the transceiver.

SUMMARY OF THE INVENTION

It is accordingly an object of the present invention to provide a mounting assembly for a transceiver which permits the transceiver to be quickly and easily mounted and dismounted therefrom.

It is a further object of the present invention to provide a mounting assembly which permits a transceiver to be mounted thereto at a mounting location positioned in a passenger compartment of the vehicle.

It is a yet further object of the present invention to provide an integrally formed mounting assembly for a transceiver of reduced cost and complexity.

In accordance with the present invention, therefore, a mounting assembly is disclosed for mounting a transceiver thereupon. The mounting assembly includes a support surface for supporting the transceiver thereupon, and permits the transceiver to be supported at a locking position thereupon. A positioner formed integral with the support surface positions the transceiver at the locking position, and a lock formed integral with the support surface locks the transceiver in place at the locking position when positioned thereat.

BRIEF DESCRIPTION OF THE DRAWINGS

The present invention will be better understood when read in light of the accompanying drawings in which.

DESCRIPTION OF THE PREFERRED EMBODIMENTS

Figure 1:
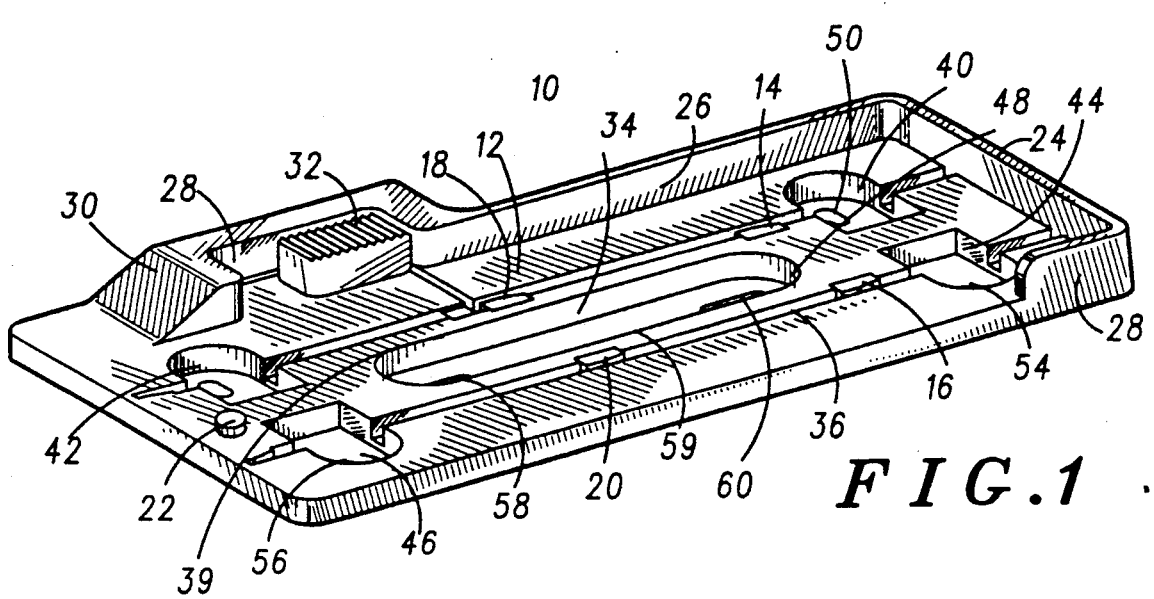
FIG. 1 is a perspective view of the mounting assembly of the present invention.

Referring first now to the perspective illustration of FIG. 1, there is shown the mounting assembly, referred to generally by reference numeral 10, of the present invention. Mounting assembly 10 is integrally formed of a flexible, thermoplastic material, such as, for example, "ABS-LEXAN" (TM). In the preferred embodiment, mounting assembly 10 is formed by an injection mold process.

Top face surface 12 of a plate-like member comprising the body of mounting assembly 10 is of dimensions suitable for positioning of at least a portion of a transceiver thereupon. Raised surface portions forming button members 14, 16, 18, 20, and 22 project above the plane of top face surface 12 such that surface portions of button members 14-22 form support surfaces to support a transceiver thereupon. Greater or fewer numbers of button members may, of course, be alternately formed to provide greater or fewer support surfaces for supporting a transceiver thereupon. Additionally, the button members 14-22 may alternately be formed upon top face surface 12 in a non-rigid manner, to permit relative fluctuation of the button members relative to top face 12 of assembly 10. Support surfaces formed upon a discrete number of button members projecting above face surface 12 minimize problems associated with tolerances in the transceiver, vibrational forces generated during operation of an automobile in which the transceiver and mounting assembly is situated, and thermally caused warpage of thermoplastic mounting assembly 10. Alternately, however, face surface 12 may form the support surface for supporting the transceiver directly thereupon.

In the preferred embodiment, mounting assembly 10 further includes backwall 24, sidewall 26, and sidewall portion 28 formed integral with the face surface 12 and projecting thereabove. A front portion of sidewall 26 is U-shaped to form compartment 28. Angled ramp 30 is formed of a front side of a leg of the U-shaped compartment 28.

Formed within the area defined by compartment 28 is a tabular projection having an enlarged, and, preferably, ribbed, face surface 32 formed upon a top surface thereof. Surface 32 forms a force receiving surface thereby, the function of which will be discussed more fully hereinbelow.

Longitudinally extending grooves 34 and 36 are formed to extend along substantially the entire length of top face surface 12 of mounting assembly 10. Grooves 34 and 36 are spaced apart at a predefined distance from one another and extend in parallel directions. Tabular projection 38 projects into the pathway defined by groove 34 to span a substantial portion of the distance separating the sidewalls which define groove 34. Tabular projection 38 further includes a side surface 39. Also illustrated in the perspective view of FIG. 1 are recessed areas 40, 42, 44, 46, and 48. The respective recessed areas 40-48 contain means forming apertures 50, 52, 54, 56, 58, 59, and 60 which permit extension of threaded shaft members (not illustrated) therethrough to facilitate affixation of the mounting assembly 10 to a mounting location.

Figure 2:
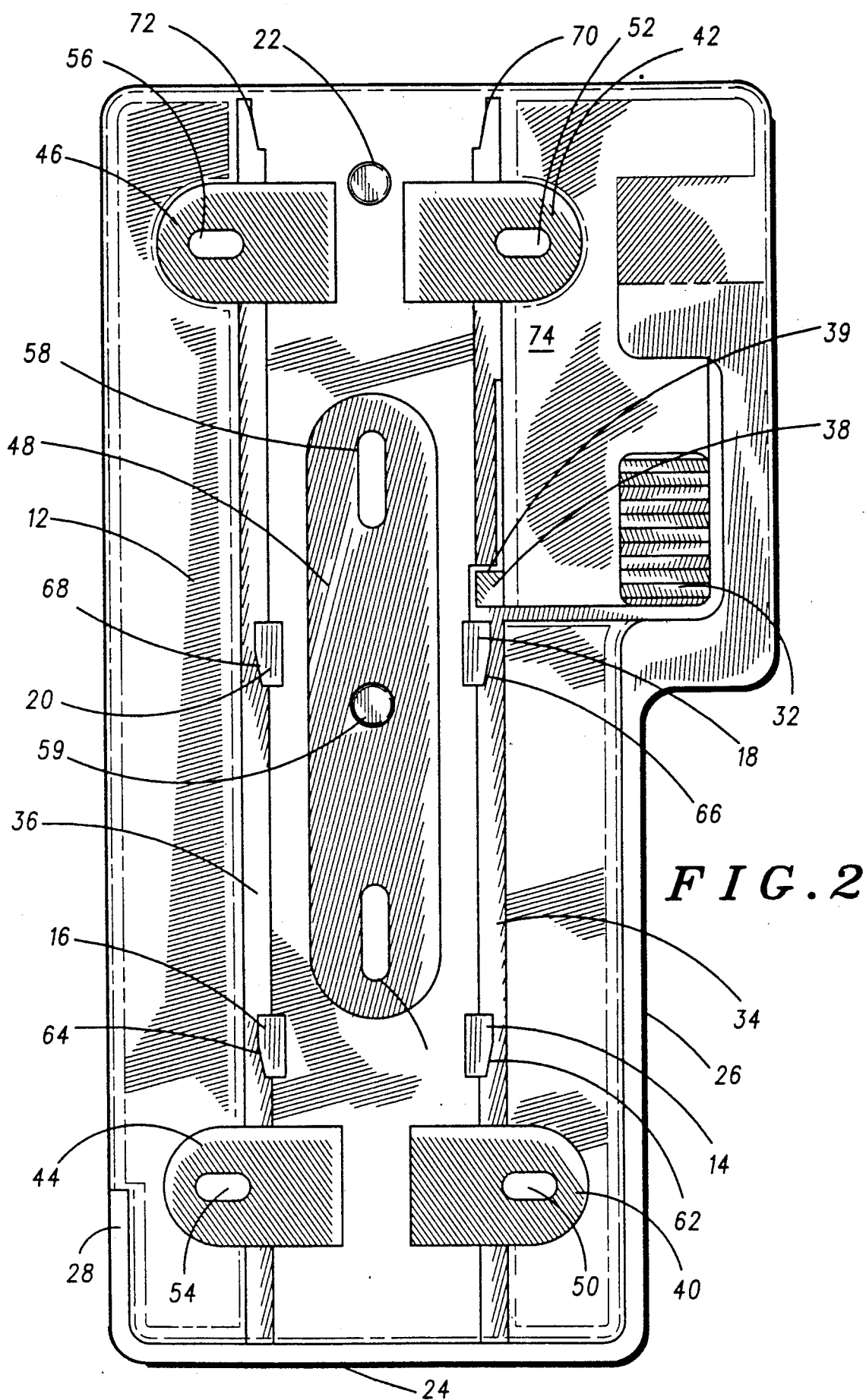
FIG. 2 is a plan view of the mounting assembly of FIG. 1.

The plan view of FIG. 2 more clearly illustrates the arrangement of the integrally formed components which comprise mounting assembly 10. Longitudinally extending grooves 34 and 36 formed to extend along surface 12 of mounting assembly 10 intersect with recessed areas 40 and 42, and recessed areas 44 and 46, respectively. Recessed areas 40-48 are of depthwise dimensions at least as great as the depthwise dimensions of grooves 34 and 36 so as not to obstruct the pathways defined by grooves 34 and 36. Button members 14-20 having face surfaces projecting above top face surface 12 further form sidewalls 62, 64, 66, and 68, respectively, of angled or wedged-shaped configurations. Sidewalls 62-68 of button members 14-20 project into the pathways defined by grooves 34 and 36 to restrict, but not obstruct, the longitudinally extending pathways defined by the respective grooves 34 and 36. Similarly configured, but formed of sidewalls defining the respective grooves 34 and 36 at front end portions of the respective grooves 34 and 36 are wedge-shaped sidewall portions 70 and 72. For reasons which will be discussed more fully hereinbelow, sidewalls 62-68 of button members 14-20 do not extend along the entire heights of the sidewalls defining grooves 34 and 36.

The plan view of FIG. 2 further illustrates the relationship between force receiving surface 32 and tabular projection 38 which projects into the pathway defined by groove 34 and the configuration of face surface portion 74 formed of a portion of top face surface 12. Gaps formed about three sides of face surface portion 74 separate face portion 74 from top face surface 12 about the three sides thereof to define portion 74 thereby. Face surface portion 74 is thereby connected to face surface 12 at only one side thereof. Because assembly 10 is comprised of a flexible, thermoplastic material, application of an actuation force upon face surface portion 74 causes flexional movement of portion 74 about the main body of surface 12. Because tabular projection 38 is formed integral with and projection from portion 74, application of an actuation force upon face surface portion 74 causes deflection of tabular projection 38. When a suitable actuation force is applied to face surface portion 74, tabular projection 38 is deflected through an opening extending through a button surface of groove 34 to thereby position tabular projection 38 beneath the bottom surface of the groove 34. When the actuation force is no longer applied upon face surface portion 74, portion 74 deflects back into an unstressed position in which tabular projection 38 again projects into the pathway defined groove 34.

Similar to the gaps formed about three sides of face surface portion 74, bottom surfaces of recessed areas 40, 42, 44, and 46 have gaps formed about three sides of their respective bottom surfaces to permit limited flexional movement of the bottom surfaces of the recessed areas. Opposite sides of the bottom surface of recessed area 48 similarly have gapped portions about end portions of opposing ends of the bottom surfaces to similarly permit limited flexional movement thereof. Limited flexional movement permitted of the bottom surfaces of recessed areas 40-48 enhance the ease of affixation of mounting assembly 10 to a mounting location.

Figure 3:
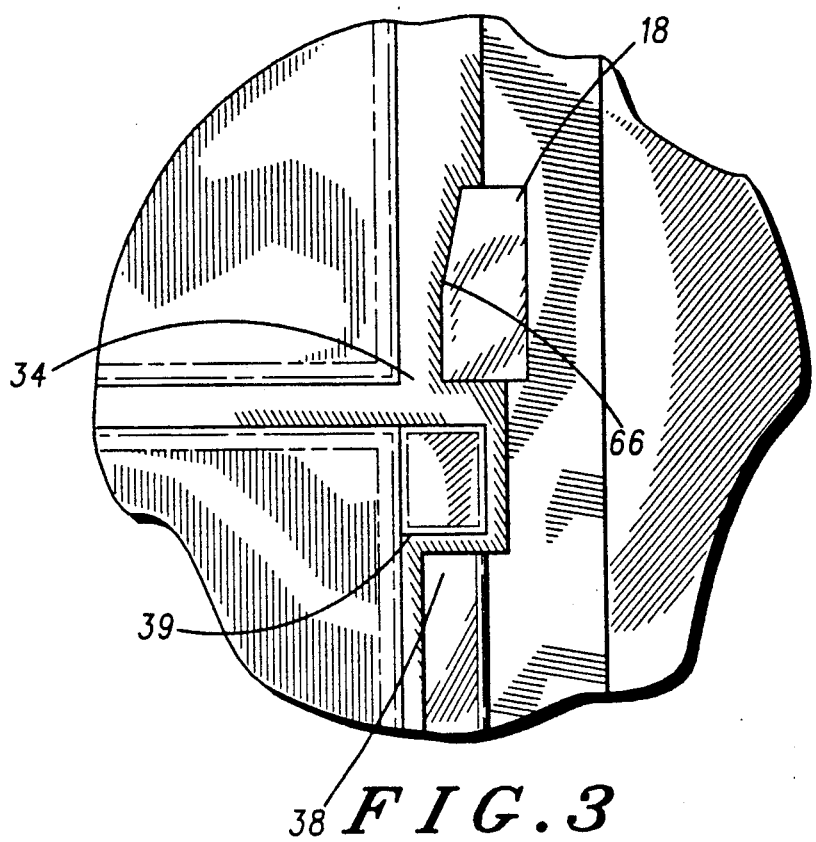
FIG. 3 is an enlarged view of a tabular projection forming a portion of the lock of the mounting assembly of the present invention.

FIG. 3 illustrates an enlarged view of tabular projection 38 and button member 18 projecting above the top surface of top face surface 12. As illustrated, the angled configuration of sidewall 66 of button member 18 restricts a cross section of the pathway defined by groove 34, and tabular projection 38 is positioned proximate to the button member 18 and projects into the area defined by groove 34 to span a substantial portion of the distance separating the opposing sidewalls which define groove 34. The angled configuration of the sidewall 66 thereby restricts the pathway defined by groove 34, and tabular projection 38 obstructs the pathway defined by groove 34. However, upon application of the actuation force described hereinabove, tabular projection 38 is deflected out of the pathway defined by groove 34.

Figure 4:
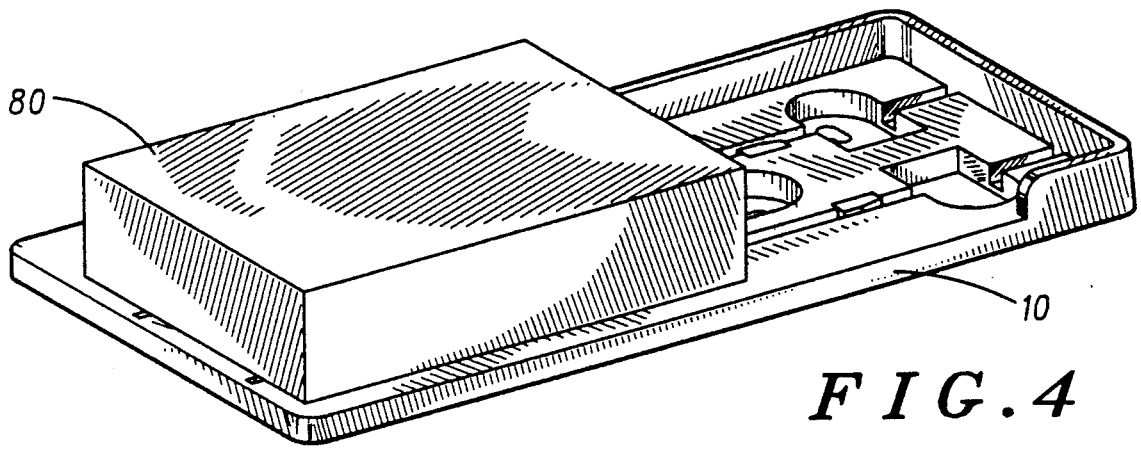
FIG. 4 is a perspective view, similar to that of FIG. 1, but further illustrating a transceiver mounted in a locking position upon the mounting assembly of the present invention.

FIG. 4 is a perspective illustration of mounting assembly 10 of the present invention in which transceiver 80 is mounted at a locking position upon the surface 12 of the mounting assembly 10. When suitably mounted, transceiver housing 80 is affixed to mounting assembly 10 to be supported thereupon. Mounting assembly 10 may be affixed in position at any mounting location, such as, for example, upon a floorboard beneath a seat in a passenger compartment of an automobile. Because mounting assembly 10 is comprised of a flexible, thermoplastic material, vibrational forces, such as vibrational forces generated during operation of an automobile, are absorbed by the mounting assembly, and are not transmitted to the transmit/receive circuitry positioned within the housing of transceiver 80.

Figure 5:
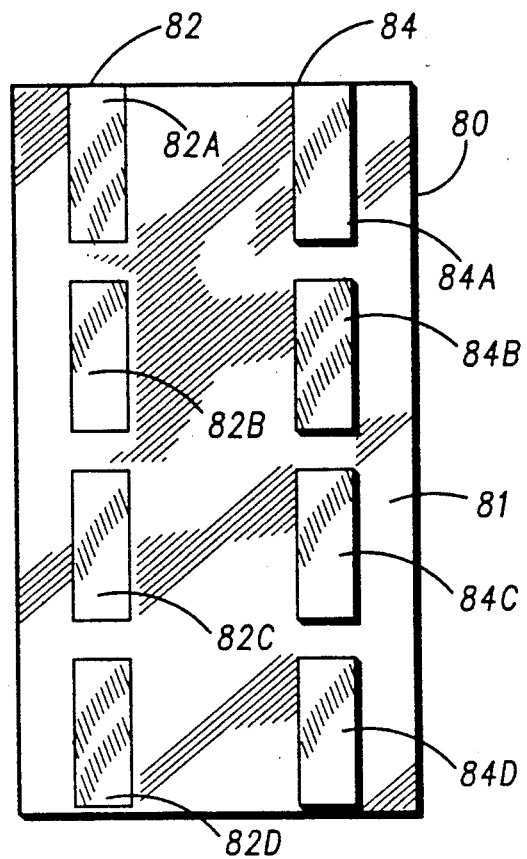
FIG. 5 is a bottom view of the transceiver shown in FIG. 4.

FIG. 5 is a bottom view of the transceiver 80 shown in FIG. 4. The bottom surface 81 of the housing of the transceiver contains longitudinally extending tracks 82 and 84. Tracks 82 and 84 project beneath the bottom surface 81 of the housing of the transceiver 80. Preferably, and as illustrated, tracks 82 and 84 are angled to form hooked projections and are comprised of a plurality of discrete segments, including segments 82A, 82B, 82C, and 82D, and 84A, 84B, 84C, and 84D. Longitudinally extending track 82 is of dimensions to permit mated engagement thereof with longitudinally extending groove 34 when transceiver 80 is positioned in a confronting relationship upon face surface 12 (or, more particularly, upon button members 14-22 projecting therefrom) of mounting assembly 10. Similarly, longitudinally extending track 84 is of dimensions to permit mated engagement thereof with longitudinally extending groove 36 when transceiver 80 is positioned in a confronting relationship upon face surface 12 (or button members 14-22 projecting upwardly therefrom) of mounting assembly 10. When suitably engaged, tracks 82 and 84 formed upon the bottom surface of the housing of the transceiver 80 permit sliding translation of the transceiver 80 along the grooves 34 and 36 formed along face surface 12. When suitably positioned such that tracks 82 and 84 engage with grooves 34 and 36, a translation force applied to the transceiver 80 causes translation of the transceiver along the grooves 34 and 36 to position the transceiver at the locking position (shown in FIG. 4) to be supported thereat. Once suitably translated to the locking position, tabular projection 38 projecting into the pathway defined by groove 34 extends between a gap separating track segments 84A and 84B. Tabular projection 38 thereby locks the transceiver 80 to mounting assembly 10 at the locking position. The angled configuration of tracks 82 and 84 permit bottom angle portions of the tracks to extend beneath bottom surfaces of the bottom members 14-20 to permit translation of the transceiver 80 and to support the transceiver in position upon the assembly 10 when the mounting assembly 10 is inverted. When inverted, bottom surfaces which project into the pathways defined by grooves 34 and 36 of the button members 14-20 form the support surfaces for supporting the transceiver 80.

Figure 6:
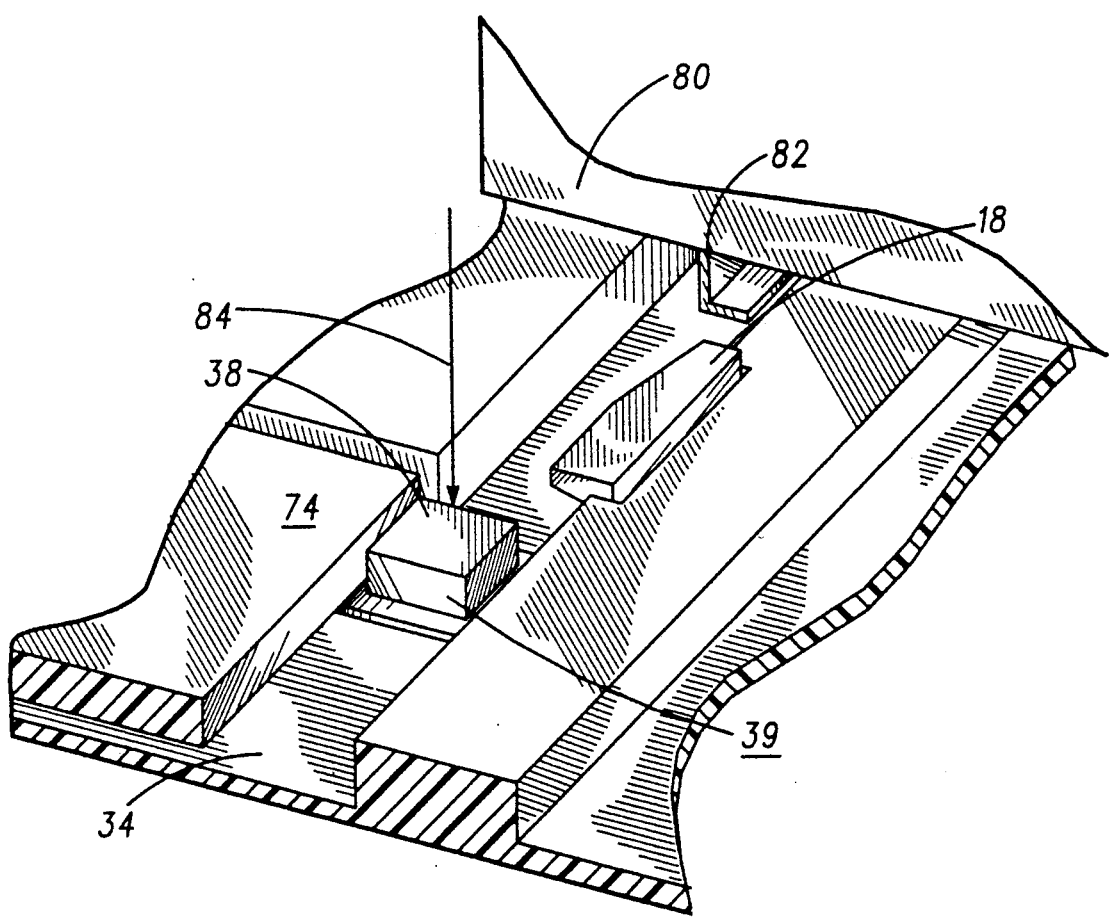
FIG. 6 is an enlarged, exploded view of a portion of the mounting assembly and transceiver shown in FIG. 4.

FIG. 6 is an enlarged, exploded view of a portion of the mounting assembly 10 and the transceiver 80, illustrating the relationship between track 82 formed upon a bottom surface of the housing 80 and the groove 34 formed to extend longitudinally along the top face surface 12 of the mounting assembly 10. In the Figure, the transceiver 80 is positioned directly above the top face surface 12 of the mounting assembly 10. By lowering the transceiver 80 such that a bottom surface 81 of the housing of the transceiver is positioned in a confronting relationship with the assembly 10, track 82 engages with longitudinally extending groove 34 (similarly, but not illustrated in FIG. 6, track 84 engages with longitudinally extending groove 36). Positioning of the transceiver 80 in the confronting relationship with surface 12 of assembly 10 is facilitated by first positioning side surfaces of the housing 80 against backwall 24, sidewall 26, and sidewall portion 28 extending above the surface of top face surface 12.

As the transceiver 80 is lowered into the confronting relationship upon mounting assembly 10, track 82 exerts a downward force (in a direction illustrated by arrow 84) upon a top surface of the tabular projection 38. As mentioned hereinabove, application of an actuation force upon face surface portion 74 causes deflection of the portion 74 about a living hinge, and, hence, deflection of the tabular projection 38 out of the pathway defining groove 34. When positioned out of the pathway defining groove 34, the transceiver is permitted sliding translation along the grooves 34 and 36 upon application of a translation force thereto.

Continued translation of the transceiver (which is supported upon top support surfaces defined by button members 14, 16, 18, 20, and 22, when transceiver 80 is positioned above assembly 10 and which is supported by bottom surfaces of button members 14, 16, 18, and 20 when transceiver 80 is positioned beneath assembly 10) causes a gap separating track segments 82A and 82B to be positioned directly above tabular projection 38. When track segment 82A of the track 82 no longer abuts against the top surface of tabular projection 38, an actuation force is no longer applied to face surface portion 74. Surface portion 74 deflects back to an unstressed position, and tabular projection 38 projects into the pathway defined by longitudinally extending groove 34, and, more particularly, tabular projection 38 extends into the gap separating track segments 82A and 82B. Further translation of transceiver 80 is thereby prevented. Projection 38 may, of course, be formed to project between other gaps separating other track segments to prevent translation of transceiver 80.

Figure 7:
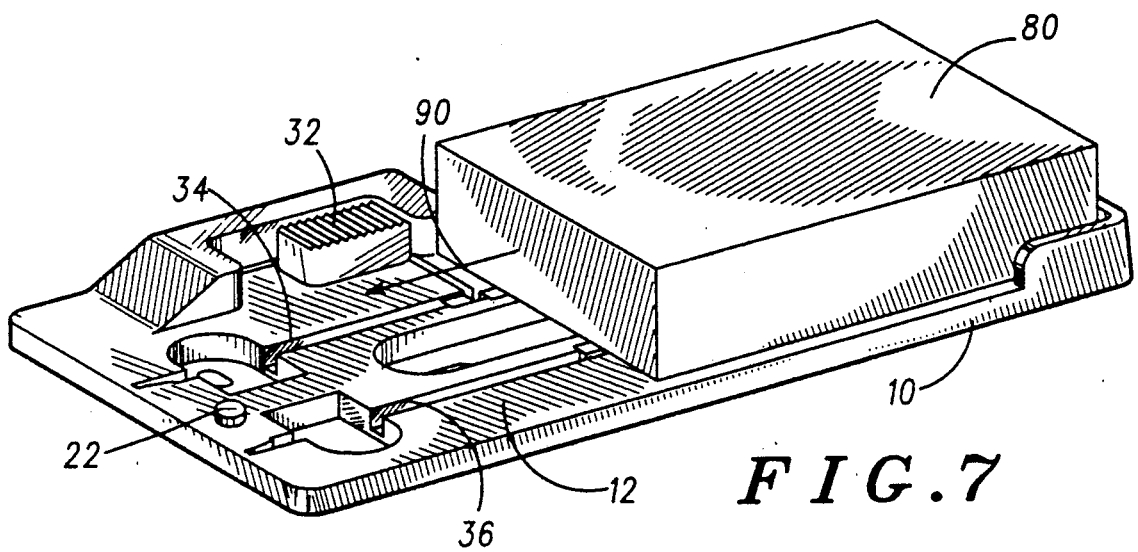
FIG. 7 is a perspective view, similar to that of FIG. 4, but illustrating the transceiver positioned in an unlocked positioned upon the mounting assembly.

FIG. 7 is a perspective view, similar to that of FIG. 4, but illustrating the transceiver 80 positioned upon the mounting assembly 10 in an unlocked position, i.e., the position of the transceiver 80 when initially positioned upon surface 12 prior to translation into the locking position, or, alternately, the position of the transceiver 80 after translation thereof out of the locking position. By applying a translation force in the direction illustrated by arrow 90, the transceiver 80 is translated along the grooves 34 and 36, as described hereinabove, until the transceiver 80 is translated into the locking position illustrated in FIG. 4.

The transceiver may be quickly and easily removed from the mounting assembly by applying a force upon force receiving surface 32 to cause deflection of face surface portion 74 of surface 12, and corresponding deflection of tabular projection 38 out of the pathway defined by groove 34. Translation of the transceiver 80 is thereby permitted upon the application of a translation force thereto. Once translation of the transceiver has commenced, track segment 82A is positioned directly above the tabular projection 38 thereby transmitting the force exerted by the weight of the transceiver 80 to the top surface of the tabular projection 38 such that the tabular projection 38 remains deflected out of the pathway defined by groove 34. Translation of the transceiver is permitted until the transmitter abuts against backwall 24. When transceiver 80 is positioned against backwall 24, none of the bottom angle portions of any of the track segments 82A-D or 84A-D engage with any of the button members 14-20, and the transceiver 80 may be removed from the mounting assembly by merely lifting the transceiver 80 thereaway.

The mounting assembly 10 may be affixed to any mounting location, such as, for example, a floorboard beneath a seat in the passenger compartment of an automobile. Once suitably affixed at a mounting location, the transceiver 80 may be mounted upon the mounting assembly 10 by merely positioning the transceiver 80 in a confronting relation upon the surface 12 of the assembly 10 such that tracks 82 and 84 extending along a bottom surface of the housing of the transceiver engage with grooves 34 and 36 formed on the face surface 12 of the assembly 10. Such positioning of the transceiver is facilitated by positioning the transceiver against backwall 24, sidewall 26, and sidewall portion 28 of the assembly 10. Then, by applying a translation force upon the transceiver to translate the transceiver along the grooves 34 and 36, the transceiver is positioned in a locking position which is tandemly positioned with the grooves 35 and 36, and the tabular projection 38 locks the transceiver in position upon the assembly 10.

The transceiver may be removed from the assembly 10 by applying an actuation force upon force receiving surface 32 to unlock the transceiver, and then applying a translation force to the transceiver to translate the transceiver out of the locking position. The transceiver may then be removed by lifting the transceiver thereaway.

Angled ramp 30 formed on a front side portion of a leg of the U defining compartment 28 aids a user in locating the force receiving surface 32 if visual location of the force receiving surface 32 is not possible. It is to be noted that mounting assembly 10 may additionally be mounted in a vertical direction, such that the transceiver is supported upon side surface 39 of tabular projection 38 which forms a support surface thereby to support the transceiver thereagainst.

While the present invention has been described in connection with the preferred embodiment shown in the various Figures, it is to be understood that other similar embodiments may be used and modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A mounting assembly for releasably mounting a transceiver at a mounting location formed thereupon, said transceiver having at least one longitudinally-extending track disposed upon a bottom face surface thereof, said mounting assembly comprising:
   means forming a support surface suitable for receiving said transceiver when the bottom face surface of the transceiver is positioned in a confronting relationship therewith and for maintaining the transceiver in supportive engagement at said mounting location formed thereupon;
   means forming a groove defined by opposing, longitudinally-extending sidewalls formed integral with the support surface and extending longitudinally therealong for receiving the at least one longitudinally-extending track disposed upon the bottom face surface of the transceiver to permit sliding engagement of the at least one longitudinally-extending track therealong; and
   means forming a tabular projection formed integral with the support surface and capable of flexional movement so as to be positioned either to project into the groove formed by the means for receiving the at least one longitudinally-extending track to prevent translation of the longitudinally-extending track therealong to releasably lock the transceiver in position thereby, or, alternately, to be positioned out of the groove to permit unimpeded translation of the at least one longitudinally-extending track therealong.

2. The mounting assembly of claim 1 wherein said means forming the support surface, said means forming the groove and said means forming the tabular projection are integrally formed of a flexible, thermoplastic material.

3. The mounting assembly of claim 1 wherein said groove formed to extend longitudinally along the support surface extends to the mounting location, such that application of a translation force to the transceiver causes translation of the at least one longitudinally-extending track disposed upon the bottom, face surface of the transceiver along said groove alternately to position the transceiver at said mounting location or to remove the transceiver from said mounting location.

4. The mounting assembly of claim 3 further comprising means for aligning the track disposed upon the bottom surface of the transceiver with the tabular projection.

5. The mounting assembly of claim 4 wherein said means for aligning comprises at least one projecting member formed upon at least one of the sidewalls defining the groove to extend into the groove, said projecting member having an angled face surface for guiding the transceiver into the mounting location when the at least one longitudinally-extending track disposed upon the transceiver is translated along the groove.

6. The mounting assembly of claim 1 wherein said flexional movement permitted of the tabular projection occurs responsive to application of an actuation force to the tabular projection to position the tabular projection out of the groove extending along the support surface.

7. The mounting assembly of claim 6 further comprising means forming a force receiving surface for receiving said actuation force.

8. The mounting assembly of claim 7 wherein said support surface is formed upon a face surface of the tabular projection.

9. The mounting apparatus of claim 7 wherein said support surface is comprised of a plurality of raised surface portions having a face surface for supporting a portion of the transceiver thereagainst.

10. The mounting apparatus of claim 9 wherein said tabular projection is formed of a portion of the plate member.

11. A method for mounting a transceiver to a mounting assembly, said transceiver having at least one longitudinally extending track disposed upon a bottom face surface thereof and said mounting assembly having at least one longitudinally-extending groove for receiving the track disposed upon the bottom face surface of the transceiver to permit thereby sliding translation of the track therealong, said method comprising the steps of:

positioning the bottom face surface of the transceiver in a confronting relation upon the mounting assembly and in supportive engagement thereupon such that the at least one track disposed upon the bottom face surface of the transceiver is aligned with the groove of the mounting assembly;

sliding the at least one longitudinally-extending track disposed upon the transceiver along the groove of the mounting assembly to position the transceiver at a locking position; and locking the transceiver in position at the locking position by preventing continued translation of the track along the groove to lock thereby the transceiver in place at the locking position.

12. The method of claim 11 wherein said step of locking comprises positioning a tabular projection into the groove such that the tabular projection prevents the continued translation of the track along the groove.

13. A transceiver assembly comprising:

a transceiver housing having transmit/receive circuitry housed therewithin, said transceiver housing having at least one longitudinally-extending track disposed upon a bottom face surface thereof; and a mount for releasably mounting the transceiver housing at a mounting location thereupon, said mount having: means forming a support surface support surface suitable for receiving said transceiver housing when the bottom face surface of the transceiver housing is positioned in a confronting relationship therewith and for maintaining the transceiver housing in supportive engagement at said mounting location formed thereupon; means forming a groove defined by opposing, longitudinally-extending sidewalls formed integral with the support surface and extending longitudinally therealong for receiving the at least one longitudinally-extending track disposed upon the bottom face surface of the transceiver housing to permit sliding engagement of the at least one longitudinally-extending track therealong; and means forming a tabular projection formed integral with the support surface and capable of flexional movement so as to be positioned either to project into the groove formed by the means for receiving the at least one longitudinally-extending track to prevent translation of the longitudinally-extending track therealong for releasably locking the transceiver housing in position thereby, or, alternately, to be positioned out of the groove to permit unimpeded translation of the at least one longitudinally-extending track therealong.

* * * * *